United States Patent
Vajravel et al.

(10) Patent No.: US 11,900,154 B2
(45) Date of Patent: Feb. 13, 2024

(54) ENABLING MODERN STANDBY FOR UNSUPPORTED APPLICATIONS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 416 days.

(21) Appl. No.: 17/195,383

(22) Filed: Mar. 8, 2021

(65) Prior Publication Data

US 2022/0283848 A1     Sep. 8, 2022

(51) Int. Cl.
G06F 9/46     (2006.01)
G06F 9/48     (2006.01)
G06F 9/50     (2006.01)
G06F 21/57    (2013.01)

(52) U.S. Cl.
CPC ............ G06F 9/4856 (2013.01); G06F 9/505 (2013.01); G06F 9/5072 (2013.01); G06F 21/57 (2013.01)

(58) Field of Classification Search
CPC ...... G06F 9/4856; G06F 9/505; G06F 9/5072; G06F 9/485
See application file for complete search history.

(56) References Cited

U.S. PATENT DOCUMENTS

| | | | | |
|---|---|---|---|---|
| 11,461,490 | B1* | 10/2022 | Livengood | G06F 3/0637 |
| 2007/0101317 | A1* | 5/2007 | Shoji | G06F 11/141 |
| | | | | 714/E11.116 |
| 2016/0294818 | A1* | 10/2016 | Badam | G06F 21/602 |
| 2017/0132025 | A1* | 5/2017 | Delio, Jr. | G06F 9/44521 |
| 2018/0232036 | A1* | 8/2018 | Varadarajan | G06F 1/3209 |

FOREIGN PATENT DOCUMENTS

WO    WO-2017080255 A1 *  5/2017

OTHER PUBLICATIONS

Desktop Activity Moderator, Sep. 1, 2020, Microsoft Learn, (Year: 2020).*

(Continued)

Primary Examiner — Emerson C Puente
Assistant Examiner — Zhi Chen
(74) Attorney, Agent, or Firm — Kirton McConkie; Brian Tucker

(57) ABSTRACT

Modern Standby is enabled for unsupported applications. An enabler driver can be included on a system that supports Modern Standby and can be configured to detect when applications are loaded on the system. When an unsupported application is loaded, the enabler driver can interface with an enabler service to determine whether the unsupported application is Modern Standby capable. If so, the enabler driver can add the unsupported application to a throttle job object that the operating system uses to determine which applications should remain active during Modern Standby. In instances where an application is deployed in a container, an enabler container service can be leveraged to determine whether the containerized application is Modern Standby capable. If so, the enabler driver can add the container to the throttle job object.

20 Claims, 10 Drawing Sheets

(56) References Cited

OTHER PUBLICATIONS

What is Modern Standby, Mar. 3, 2021, Microsoft Learn, (Year: 2021).*
Hamlin et al., Modern Standby on Dell Client PCs, Nov. 2019, Dell Technologies, Rev. 1.0 (Year: 2019).*
What is the difference between the Universal Windows Platform (UWP) store app and the desktop app, Feb. 25, 2021, Followmee.com (Year: 2021).*
How can the app track when my Windows 10 device is in sleep mode, Feb. 25, 2021, Followmee.com (Year: 2021).*

* cited by examiner

ENABLING MODERN STANDBY FOR UNSUPPORTED APPLICATIONS

CROSS-REFERENCE TO RELATED APPLICATIONS

N/A

BACKGROUND

Modern Standby is a power model for systems running the Windows operating system and is intended to provide an instant on/instant off experience similar to a smartphone. A system may transition from the on state (e.g., when the screen is on) to Modern Standby for a number of reasons (e.g., when the user presses the power button, closes a laptop or selects Sleep from the Windows Start menu, when the system idles out, etc.). Many of the details of how the operating system implements Modern Standby are beyond the scope of this disclosure. Of relevance, however, is that supported applications may periodically become active during Modern Standby. For example, an email application may become active to process an incoming email without waking the system from Modern Standby.

Currently, the Windows operating system only provides Modern Standby support to Universal Windows Platform (UWP) applications. In other words, any application that is not a UWP application, such as a desktop application or web/browser-based application, will remain suspended for the duration of Modern Standby. Additionally, if a UWP application is run in a container on the system, Modern Standby will no longer be enabled for the UWP application. Containerization in the software context refers to a technique for packaging an application and its dependencies into a container to abstract/isolate the application from the underlying host operating system and environment. A number of containerization techniques exist.

FIG. 1 is intended to represent a system 100 that supports Modern Standby. As shown, the operating system running on system 100 may include, among other components, a desktop activity moderator (DAM) driver 111 (e.g., DAM.sys in Windows) and a process/image load notifier 112 (or load notifier 112). FIG. 1 also shows that there are four applications, applications 121-124, running on system 100. It is assumed that applications 121 and 123 are UWP applications while applications 122 and 124 are not. Applications 123 and 124, with the associated binaries/libraries 131a and 132a, are also run within containers 131 and 132 respectively.

As part of the DAM phase of Modern Standby, the Windows operating system suspends all non-UWP applications. In particular, when the system is active, DAM driver 111 interfaces with load notifier 112 to identify any application that is loaded. For any non-UWP application that is loaded or any UWP application that is deployed in a container, DAM driver 111 can assign the application to a suspend job object. In contrast, for any UWP application that is loaded, DAM driver 111 can assign the application to a throttle job object. Then, during the DAM phase, all applications identified in the suspend job object will be suspended for the duration of Modern Standby, whereas any application identified in the throttle job object will remain running at reduced activity. Therefore, any desktop application or any application deployed in a container will be assigned to the suspend job object and, as a result, will be suspended during Modern Standby.

Accordingly, after Modern Standby has transitioned through the DAM phase, application 122, as a desktop application running on the operating system, will be suspended. Applications 123 and 124 will also be suspended because the operating system will view their containers 131 and 132 as desktop applications. For example, if containers 131 and 132 are Docker containers, load notifier 112 will only see the process dockerd.exe rather than application 123's and application 124's executables. As a result, even though application 123 is a UWP application, it will be suspended during the DAM phase. As can be seen, even though system 100 implements Modern Standby, a limited subset of applications will benefit from it.

BRIEF SUMMARY

The present invention extends to systems, methods and computer program products for enabling Modern Standby for unsupported applications. An enabler driver can be included on a system that supports Modern Standby and can be configured to detect when applications are loaded on the system. When an unsupported application is loaded, the enabler driver can interface with an enabler service to determine whether the unsupported application is Modern Standby capable. If so, the enabler driver can add the unsupported application to a throttle job object that the operating system uses to determine which applications should remain active during Modern Standby. In instances where an application is deployed in a container, an enabler container service can be leveraged to determine whether the containerized application is Modern Standby capable. If so, the enabler driver can add the container to the throttle job object.

In some embodiments, the present invention may be implemented as a method for enabling Modern Standby for unsupported applications. It can be detected that an application has been loaded on a system. The application can then be examined to determine whether the application is capable of remaining active during Modern Standby. When it is determined that the application is capable of remaining active during Modern Standby, the application can be added to a data structure that defines applications that will remain active when the system enters Modern Standby. When it is determined that the application is not capable of remaining active during Modern Standby, the application can be added to a data structure that defines applications that will be suspended when the system enters Modern Standby.

In some embodiments, the present invention may be implemented as computer storage media storing computer executable instructions which when executed on a system that supports Modern Standby implement a method for enabling Modern Standby for unsupported applications. The computer executable instruction can register to be notified when applications are loaded on the system. In response to being notified that a first application has been loaded on the system, the computer executable instructions can determine that the first application is an unsupported application. The computer executable instructions can then examine the first application to determine that the first application is capable of remaining active during Modern Standby. The computer executable instructions can then add the first application to a data structure that defines applications that will remain active when the system enters Modern Standby.

In some embodiments, the present invention may be implemented as a system for enabling Modern Standby for unsupported applications. The system can include one or more processors and computer storage media storing computer executable instructions which when executed by the one or more processors implement a method for enabling Modern Standby for unsupported applications. It can be detected that an application has been loaded on the system and then the application can be examined to determine whether the application is capable of remaining active during Modern Standby. When it is determined that the application is capable of remaining active during Modern Standby, the application can be added to a data structure that defines applications that will remain active when the system enters Modern Standby. When it is determined that the application is not capable of remaining active during Modern Standby, the application can be added to a data structure that defines applications that will be suspended when the system enters Modern Standby.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "Modern Standby" will be used in accordance with its standard definition in the Windows operating system context and encompasses Connected Standby and Disconnected Standby. However, the present invention can be implemented on systems running other operating systems, and therefore, Modern Standby can be construed as a sleep state in which the system periodically wakes to perform software activities (e.g., the S0ix states on an Intel architecture). The term "unsupported applications" will be used to represent applications that the operating system would not allow to perform software activities during Modern Standby. For example, unsupported applications can be those that the operating system would cause to be suspended during Modern Standby. As described in the background, in current versions of the Windows operating system, the unsupported applications would include any non-UWP application and any containerized application. Embodiments of the present invention encompass techniques by which such unsupported applications are enabled to run during Modern Standby.

Although the description employs Windows-based examples and terminology, embodiments of the present invention should not be construed as being limited to implementation on Windows-based systems. To the contrary, other operating systems (e.g., Android and Linux) include components that are functionally similar or equivalent to the Windows-based components described herein. Therefore, the techniques described herein by which embodiments of the present invention enable Modern Standby for unsupported applications can be employed on systems running any operating system and having any hardware that supports Modern Standby.

Figure 1:
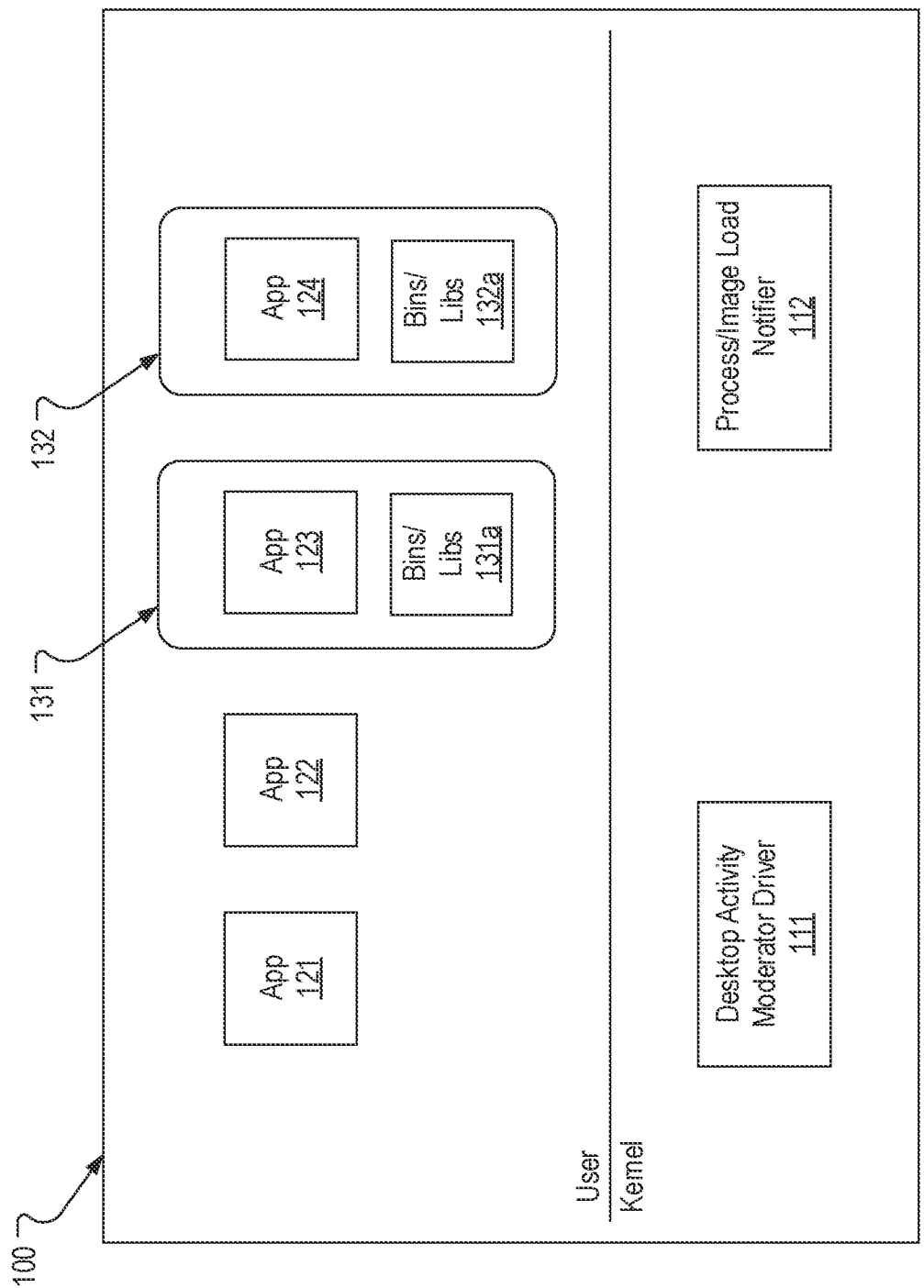
FIG. 1 provides an example of system that enables Modern Standby for supported applications.
Figure 2:
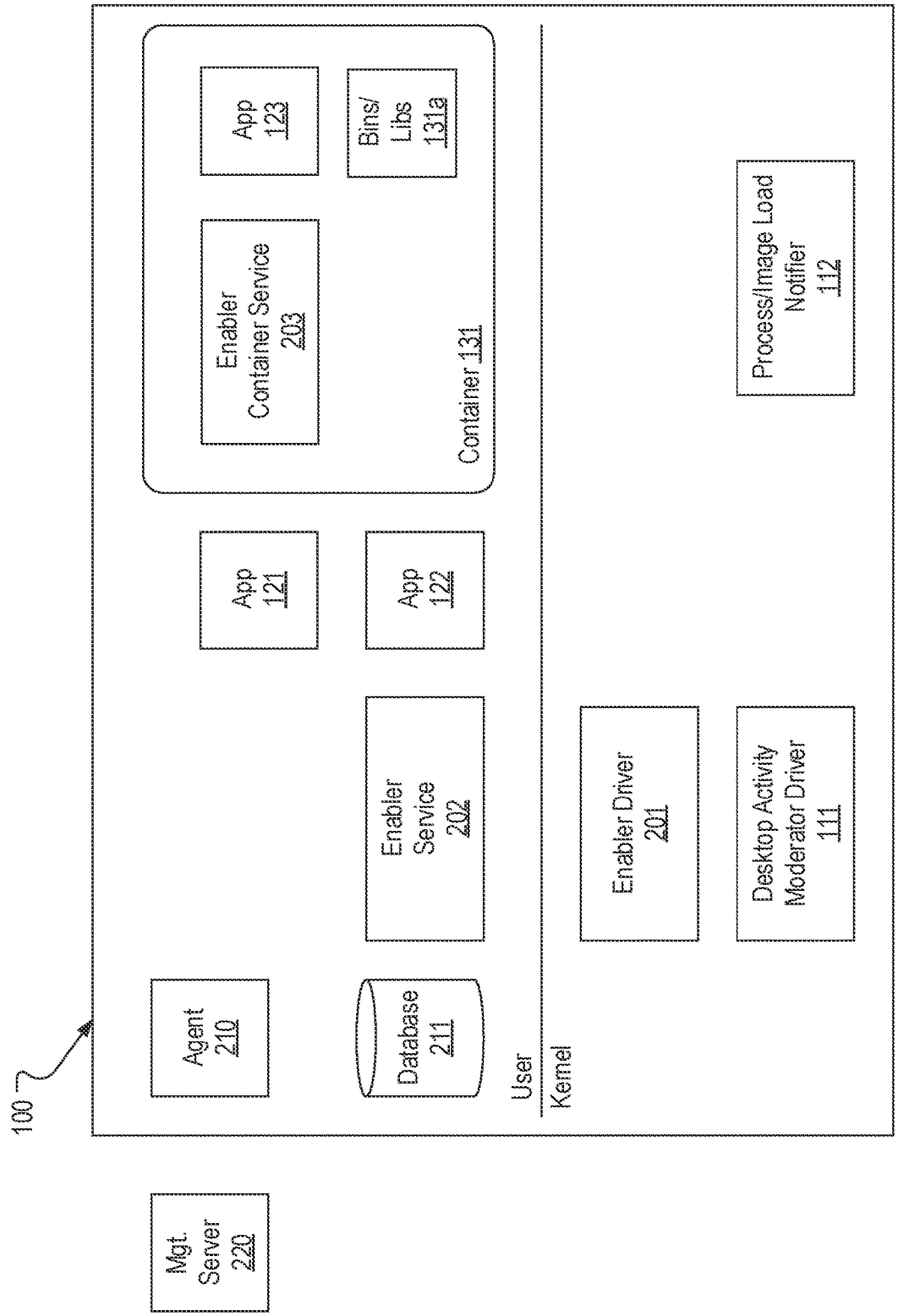
FIG. 2 provides an example of various components that can be included on a system to enable Modern Standby for unsupported applications.

FIG. 2 provides an example of various components that can be employed on system 100 to enable Modern Standby for unsupported applications. As introduced in the background, the operating system on system 100 can include DAM driver 111 and load notifier 112. A number of applications can also be run on system 100 including, in this example, application 121 which is assumed to be a UWP application, application 122 which is assumed to be a non-UWP application and application 123 which is assumed to be a UWP application that is run within container 131. Therefore, application 122 and application 123 can be considered unsupported applications because the operating system will suspend them during Modern Standby.

In accordance with embodiments of the present invention and to enable application 122 and application 123 to run during Modern Standby, system 100 can also include an enabler driver 201 (which may be a kernel-mode component on some operating systems), an enabler service 202 (which may be a user-mode component on some operating systems) and an enabler container service 203 for any container that may be created on system 100. In some embodiments, enabler container service 203 can be a background service that is bundled and deployed with any application and its binaries/libraries that are deployed in a container (i.e., an instance of enabler container service 203 may run in any container created on system 100). In some embodiments, an agent 210 and database 211 may also be included on system 100, and agent 210 may interface with a management server 220.

As introduced in the background, the operating system may maintain a throttle job object (or other data structure) which lists applications that will not be suspended during Modern Standby and a suspend job object (or other data structure) which lists applications that will be suspended during Modern Standby. As an overview of embodiments of the present invention, enabler driver 201 and enabler service 202 (including enabler container service 203 in cases where an application is deployed in a container) can interoperate to cause unsupported applications that are capable of running during Modern Standby to be included in the throttle job object as opposed to the suspend job object so that the unsupported applications will run during Modern Standby.

Figure 3A:
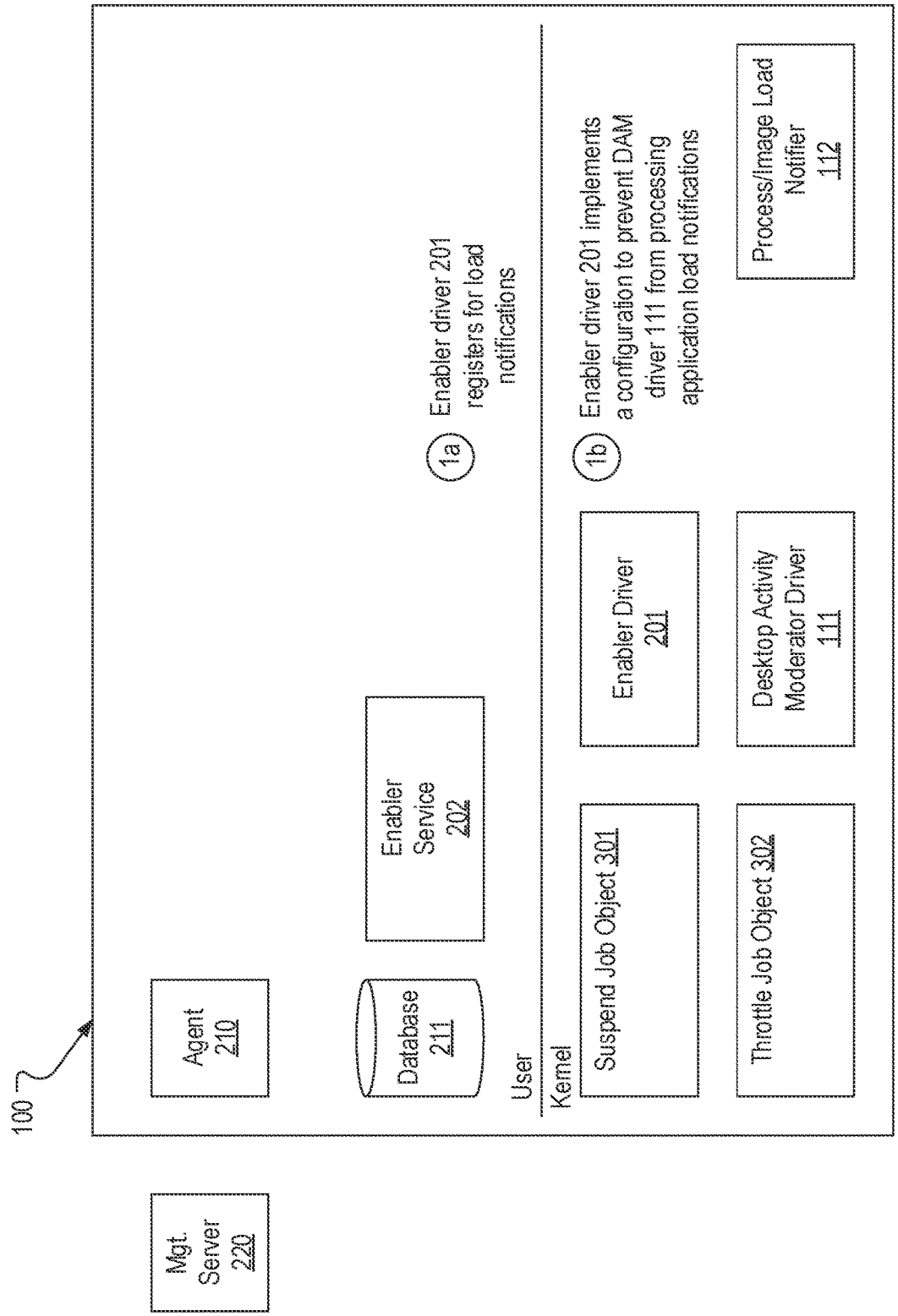
FIGS. 3A and 3B provide an example of how an enabler driver can prevent an unsupported application from being added to a suspend job object.
Figure 3B:
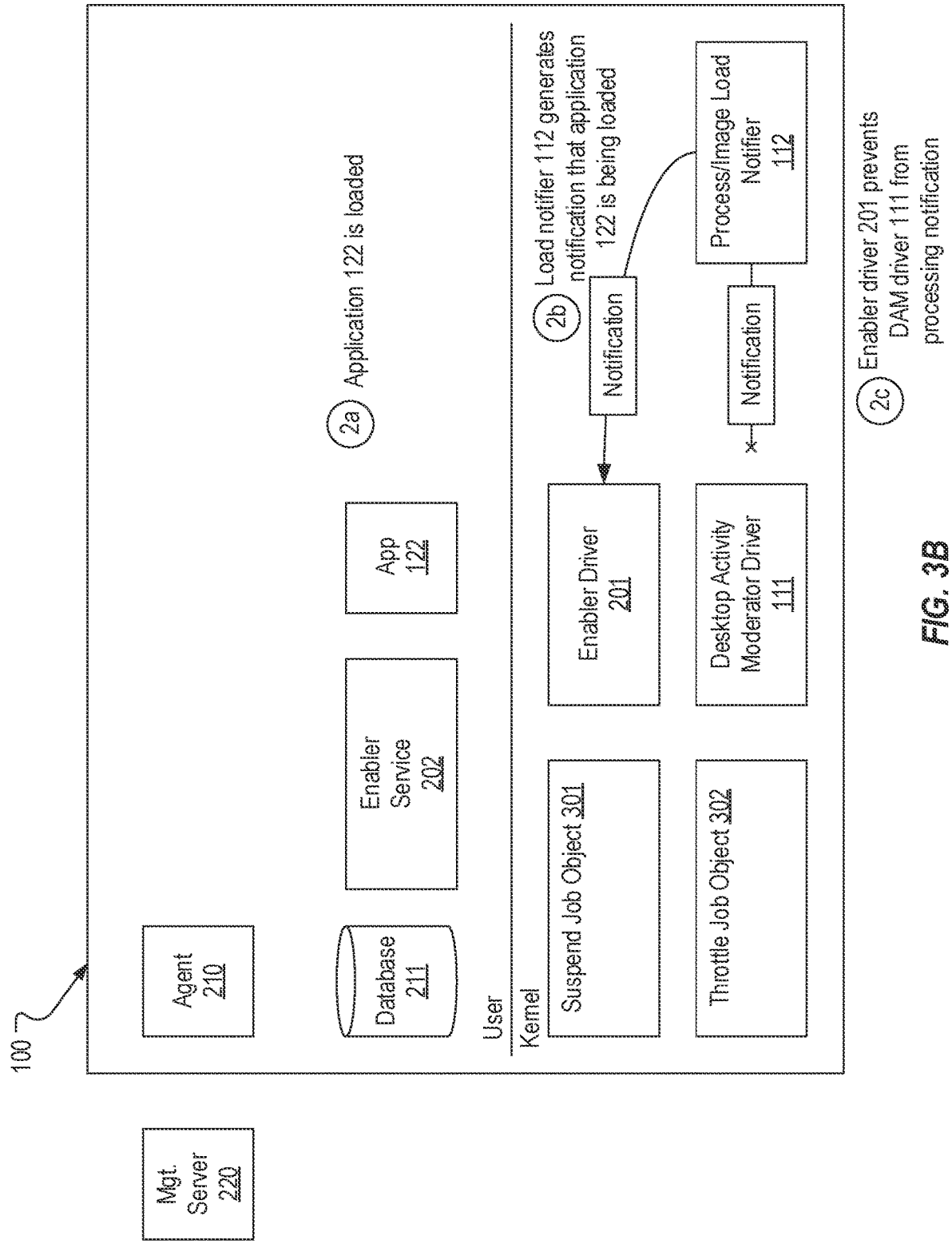

FIGS. 3A and 3B provide an example of functionality that enabler driver 201 may perform in some embodiments to prevent an unsupported application from being added to suspend job object 301 and therefore from being suspended during Modern Standby. FIG. 3A can represent the state of system 100 during startup, or at least prior to applications being loaded. As shown, enabler driver 201 can be loaded during startup or prior to applications being loaded so that, in step 1a, it can register to be notified when applications are loaded. For example, enabler driver 201 can call the PsSetLoadImageNotifyRoutine function to register a load-image notify routine that load notifier 112 will call whenever an application is loaded.

In step 1b, enabler driver 201 can also implement a configuration to prevent DAM driver 111 from processing application load notifications. There are a variety of ways in which enabler driver 201 may implement this step 1b. For example, enabler driver 201 could be installed with a load-order start type of SERVICE_BOOT_START whereas DAM driver 111 will be loaded with a load-order start type of SERVICE_SYSTEM_START. In such embodiments, enabler driver 201 would be loaded prior to DAM driver 111 and, as part of being loaded, could register the maximum number of load-image notify routines via the PsSetLoadImageNotifyRoutine function. This will prevent DAM driver 111 from registering a load-image notify routine when it calls the PsSetLoadImageNotifyRoutine.

As another example, enabler driver 201 could install a hook or other functionality to intercept calls to the PsSetLoadImageNotifyRoutine. In such embodiments, when DAM driver 111 calls PsSetLoadImageNotifyRoutine to register its load-image notify routine, enabler driver 201 can intercept the call and block the registration. In a similar example, enabler driver could install a hook or other functionality to intercept calls to any load-image notify routine that DAM driver 111 may register via the PsSetLoadImageNotifyRoutine. In such embodiments, when DAM driver 111's load-image notify routine is called in response to an application being loaded, enabler driver 201 can intercept the call and prevent DAM driver 111 from processing the notification in a typical manner. For example, if the loaded application is a supported application, enabler driver 201 could invoke DAM driver 111's load-image notify routine to cause DAM driver 111 to handle the notification in a typical fashion. In contrast, if the loaded application is not a supported application, enabler driver 201 can forego invoking DAM driver 111's load-image notify routine. As a further example, enabler driver 201 could employ any operating-system-provided API to directly accomplish any of the above-described functionality. Accordingly, step 1b should encompass any technique that enabler driver 201 can employ to block DAM driver 111 from receiving notifications when applications are loaded or to otherwise prevent DAM driver 111 from processing such notifications to assign the applications to either suspend job object 301 or throttle job object 302.

Turning to FIG. 3B, it is now assumed that application 122 is loaded in step 2a. In conjunction with application 122 being loaded, in step 2b, load notifier 112 will generate a notification and send it to any component that has registered for such notifications (e.g., by calling each registered load-image notify routine and passing a structure containing information about the process that is being loaded). Because enabler driver 201 registered a load-image notify routine in step 1a, load notifier 112 will call this load-image notify routine in step 2b to provide enabler driver 201 with the notification that application 122 has been loaded. How enabler driver 201 responds to such notifications is described below.

In step 2c, enabler driver 201 also prevents DAM driver 111 from processing the notification. The exact technique that enabler driver 201 employs to perform step 2c is dependent on how enabler driver 201 performed step 1b. For example, if enabler driver 201 prevented DAM driver 111 from registering a load-image notify routine, load notifier 112 will not attempt to notify DAM driver 111 that application 122 has been loaded. In contrast, if enabler driver 201 has hooked DAM driver 111's load-image notify routine, enabler driver 201 can cause the routine to complete without allowing DAM driver 111 to add application 122 to suspend job object 301. Accordingly, step 2c can encompass any functionality that enabler driver 201 performs prior to application 122 being loaded or in response to application 122 being loaded that prevents DAM driver 111 from adding application 122 to suspend job object 301. To be clear, absent the functionality that enabler driver 201 performs (at least in current versions of Windows), DAM driver 111 would add application 122 to suspend job object 301 because application 122 is not a UWP application.

Although not represented in the figures, in some embodiments, enabler driver 201 may only prevent DAM driver 111 from being notified when an application is loaded when the application is not a UWP application or is not a containerized application. In other words, if a UWP application (or an otherwise supported application) is loaded, enabler driver 201 may allow DAM driver 111 to handle the resulting notification in a typical manner to thereby allow DAM driver 111 to add the application to throttle job object 302 (e.g., by not blocking a call to DAM driver 111's load-image notify routine, by directly invoking DAM driver 111's load-image notify routine, etc.). In other embodiments, however, enabler driver 201 may prevent DAM driver 111 from processing notifications that UWP applications have been loaded, and in such embodiments, enabler driver 201 can add the UWP applications to throttle job object 302. Accordingly, in some embodiments, enabler driver 201 may identify the type of the loaded application as part of step 2c (e.g., identifying whether the loaded application is a UWP application).

Figure 4A:
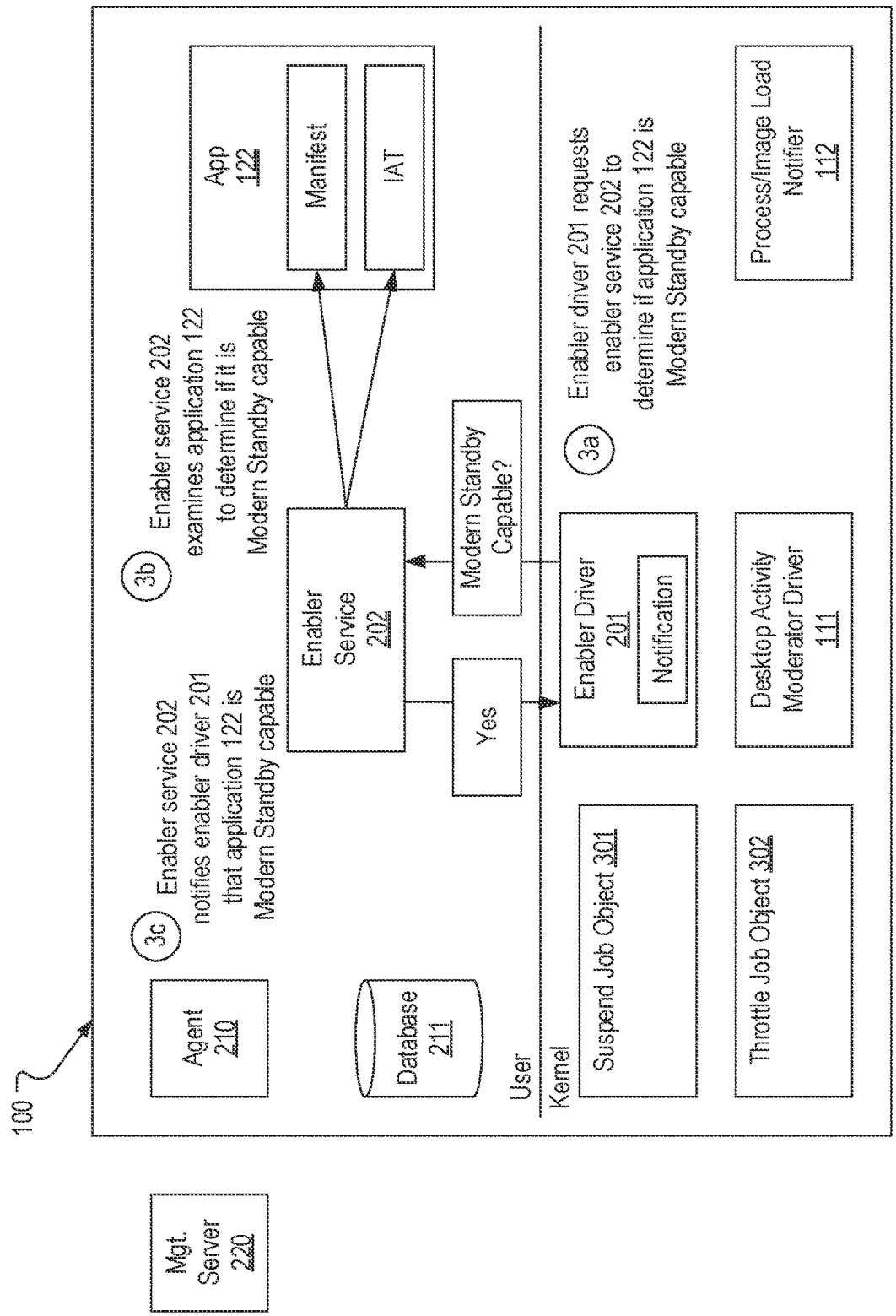
FIGS. 4A and 4B provide an example of how an enabler driver and an enabler service can determine if an application is Modern Standby capable and, if so, add the application to a throttle job object to cause the application to remain active during Modern Standby.
Figure 4B:
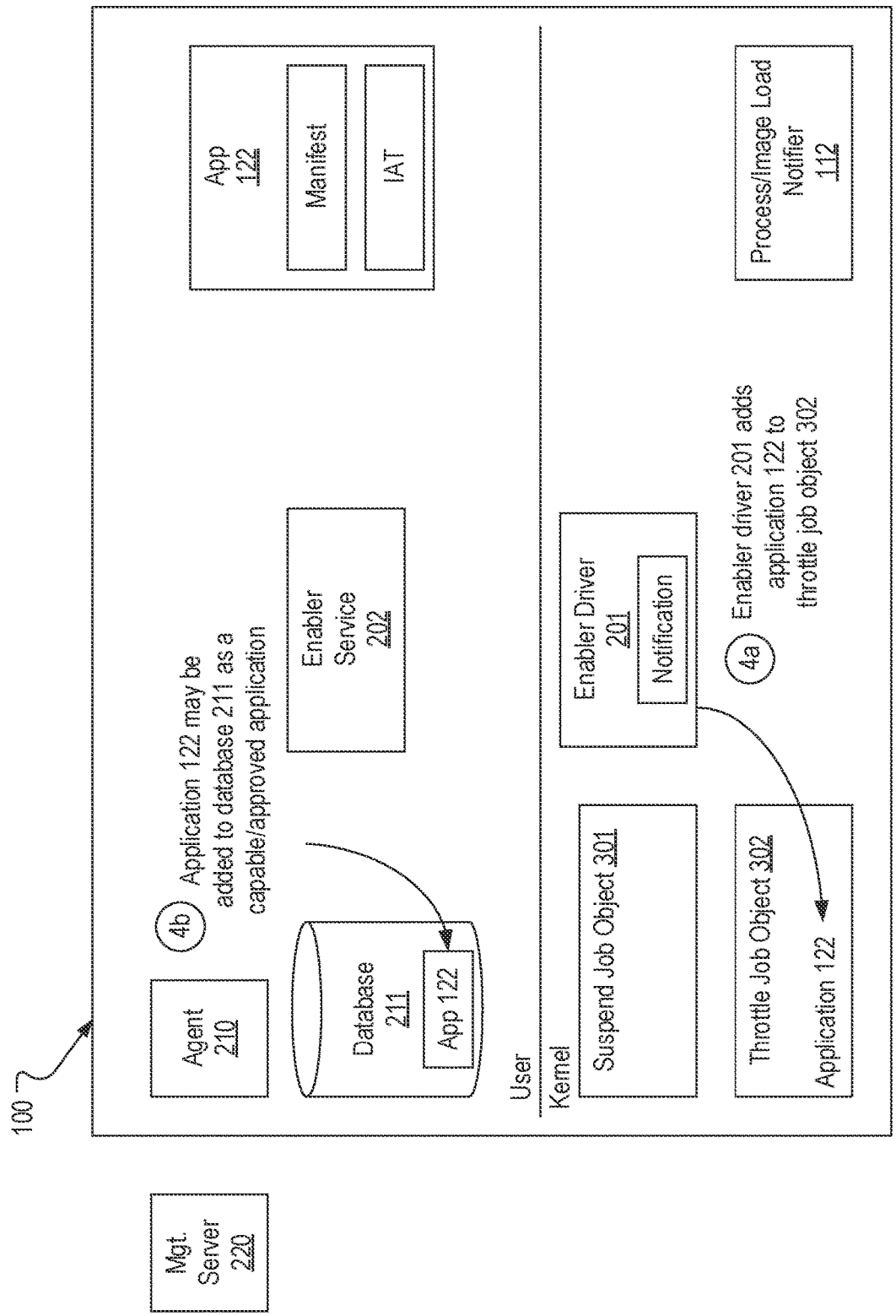

FIGS. 4A and 4B, which are a continuation of the example in FIGS. 3A and 3B, provide an example of functionality that enabler driver 201 and enabler service 202 may perform in some embodiments to determine whether a loaded application should be enabled for Modern Standby. In FIG. 4A, enabler driver 201 has been notified that application 122 has been loaded. Accordingly, in some embodiments, FIG. 4A can represent functionality that enabler driver 201 performs as part of its load-image notify routine that load notifier 112 calls when an application is loaded. In step 3a, enabler driver 201 requests that enabler service 202 determine if application 122 is Modern Standby capable. Enabler driver 201 may do so to ensure that it does not add an application to throttle job object 302 that will not function properly if it is not suspended during Modern Standby. In step 3a, enabler driver 201 may provide enabler service 202 with sufficient information to identify the application that has been loaded. For example, enabler driver 201 may provide to enabler service 202 a process ID or other process information it obtains when its load-image notify routine is called in step 2b.

In step 3b, and based on the information that enabler driver 201 provided, enabler service 202 can locate and examine the loaded application, which in this example is application 122, to determine if it is Modern Standby capable. For example, enabler service 202 can examine application 122's manifest and/or import address table to determine if application 122 uses APIs that are necessary to run properly during Modern Standby. In some embodiments, such APIs may include those in the Windows.Networking.PushNotifications namespace.

In step 3c, enabler service 202 can respond to enabler driver 201 with an indication of whether the loaded application is Modern Standby capable. In the depicted example, it will be assumed that enabler service 202 would notify enabler driver 201 that application 122 is Modern Standby capable.

Turning to FIG. 4B, if enabler service 202 indicates that the loaded application is Modern Standby capable, enabler driver 201 can cause the loaded application to be added to throttle job object 302. For example, FIG. 4B shows that enabler driver 201 has updated throttle job object 302 to identify application 122. In some embodiments, enabler driver 201 could do so by calling the AssignProcessToJobObject function and passing a handle to Application 122's process. On the other hand, if enabler service 202 had responded that application 122 is not Modern Standby capable (or otherwise should not be allowed to run during Modern Standby), enabler driver 201 could add application 122 to suspend job object 301.

Accordingly, as a result of the functionality represented in FIGS. 4A and 4B, enabler driver 201 will cause a loaded application to either be added to suspend job object 301 or to throttle job object 302. By adding an application to throttle job object 302, the application, including unsupported applications, will not be suspended during the DAR phase of Modern Standby. It is noted that load notifier 112 will also notify enabler driver 201 whenever an application exits (i.e., load notifier 112 calls enabler driver 201's load-image notify routine whenever a process is created or deleted). In response to being notified that an application is exiting, enabler driver 201 can remove the application from suspend job object 301 or throttle job object 302.

In some embodiments, enabler driver 201 and enabler service 202 may perform this functionality for all applications that are loaded including UWP applications. In other embodiments as suggested above, enabler driver 201 may be configured to allow DAM driver 111 to add loaded non-containerized UWP applications to throttle job object 302, or in other words, to allow DAM driver 111 to handle in a typical manner any notification that a supported application has been loaded.

In some embodiments, database 211 may be employed to store an identification of applications that are Modern Standby capable and/or pre-approved to run during Modern Standby. In such embodiments, enabler service 202 can leverage database 211 to avoid having to evaluate an application to determine whether it is Modern Standby capable. In other words, in some embodiments, in step 3b, enabler service 202 may access database 211 to determine if the loaded application has already been determined to be Modern Standby capable, and if so, can forego examining the loaded application. Accordingly, FIG. 4B also includes a step 4b in which application 122 is added to database 211 as a capable/approved application so that, if application 122 is subsequently loaded, enabler service 202 can access database 211 in step 3b to quickly confirm that application 122 is Modern Standby capable without having to again examine application 122 directly.

In some embodiments, agent 210 may be employed to add applications to database 211. For example, an admin could use management server 220 to push down a list of Modern Standby capable/approved applications to agent 210 which could then update database 211 accordingly. In some embodiments, the applications that are included in database 211 as approved applications can be based on one or more policies, priorities or settings. For example, to implement a battery saver policy, agent 210 could configure database 211 to identify some applications as approved to run during Modern Standby while identifying others that are not even though they are Modern Standby capable. In this way, agent 210 can control the number and/or type of applications that may run during Modern Standby to ensure that power consumption is maintained below a desired threshold. Similarly, agent 210 could cause database 211 to identify a particular set of applications as allowed so that they will always remain available during Modern Standby in accordance with some policy.

Figure 5A:
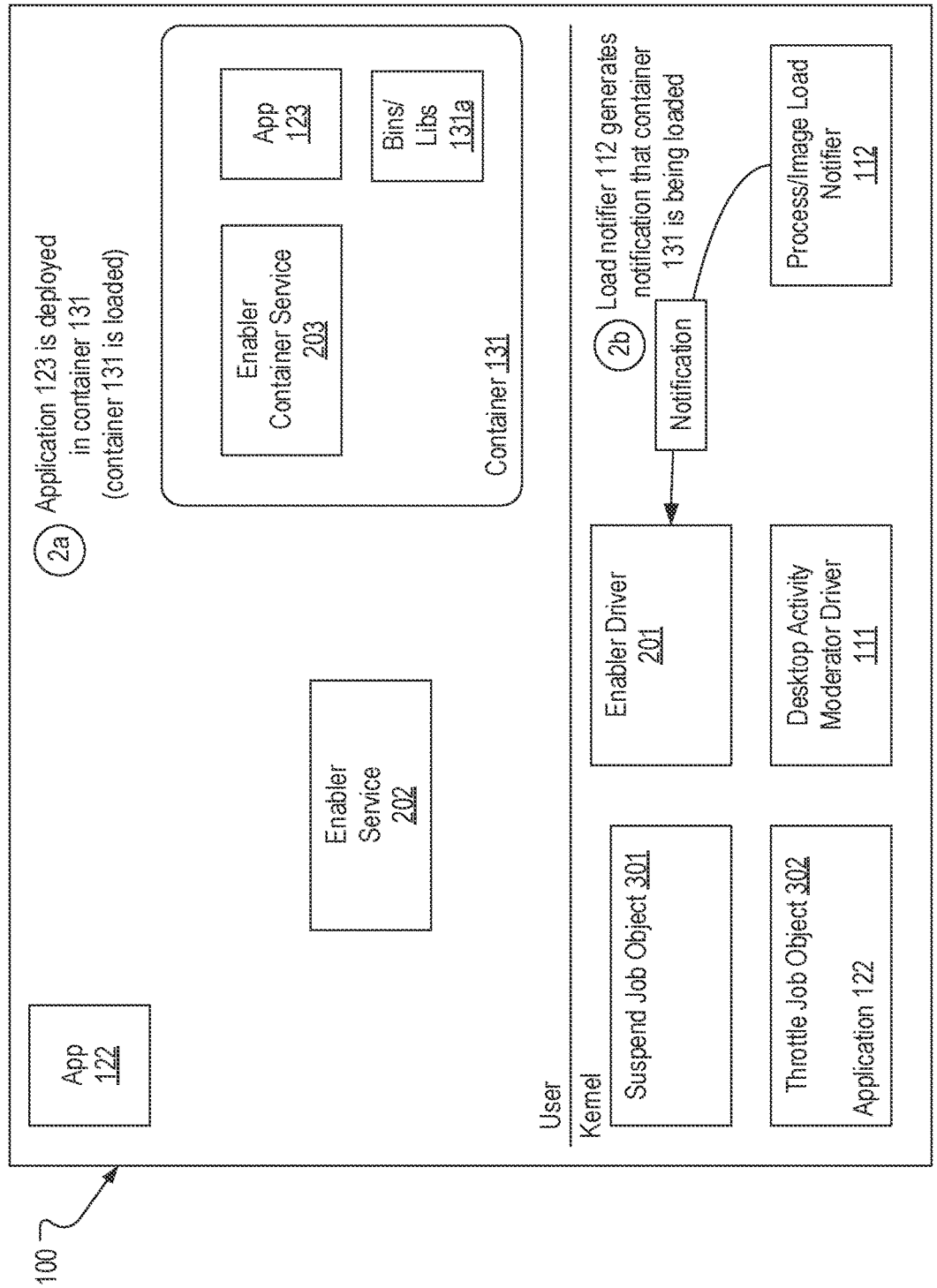
FIGS. 5A-5C provide an example of how an enabler driver, an enabler service and an enabler container service can determine if an application deployed in a container is Modern Standby capable and, if so, add the container to a throttle job object to cause the application deployed in the container to remain active during Modern Standby.
Figure 5B:
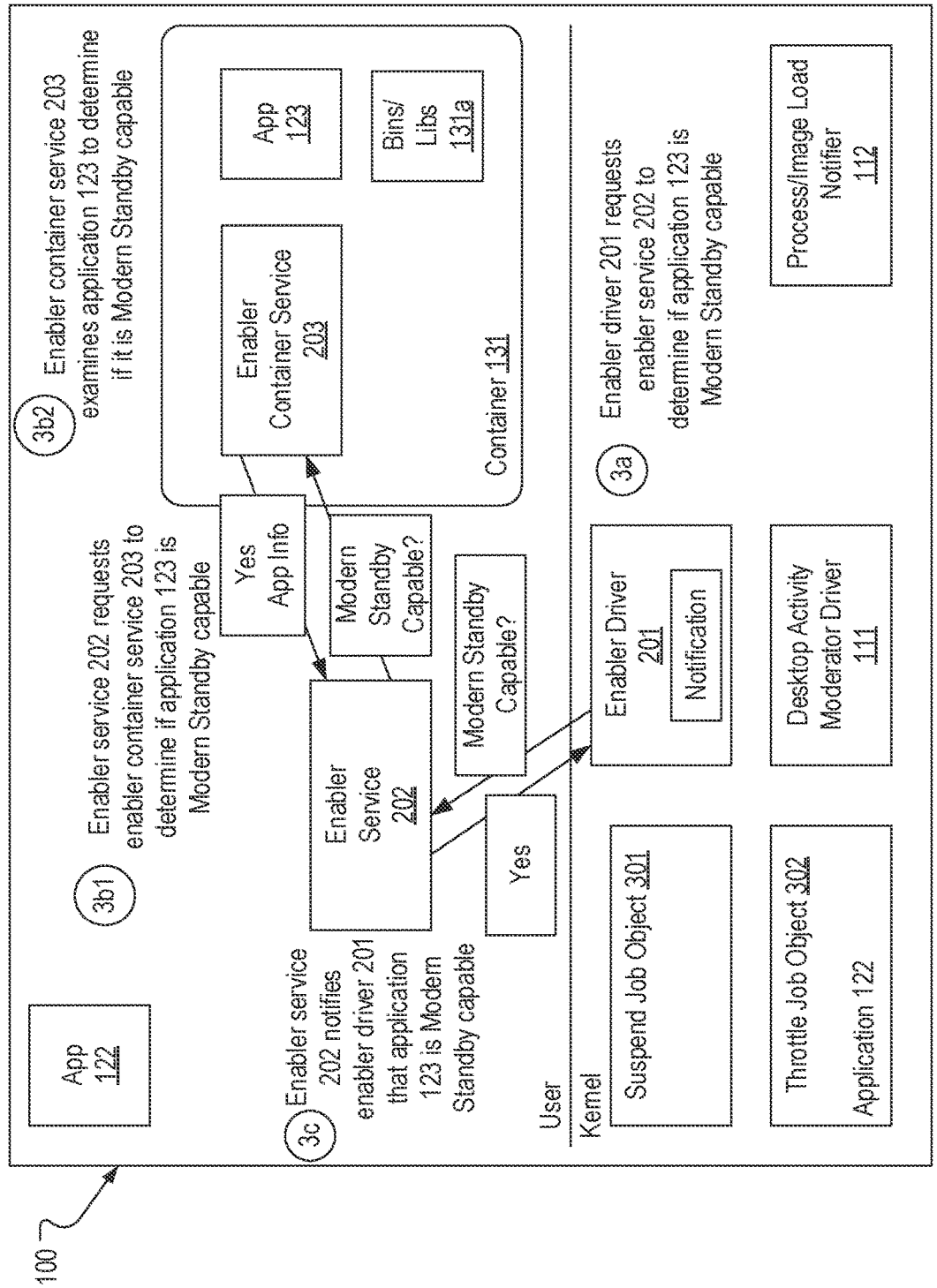

In instances where the loaded application is running in a container, a slightly different process is performed. These differences are illustrated in FIGS. 5A and 5B. As shown in FIG. 5A, it is assumed that application 123 is deployed within container 131 in step 2a. It is also assumed that application 122 is still running when application 123 is deployed. In step 2b, load notifier 112 will notify enabler driver 201 that container 131 has been loaded.

Turning to FIG. 5B, enabler driver 201 can perform step 3a as described above except that the request to enabler service 202 will identify container 131 as opposed to application 123. In comparison to step 3b described above, when an application is deployed within a container, there will be two sub-steps, 3b1 and 3b2, that are performed to determine if the application deployed in the container is Modern Standby capable. In sub-step 3b1, enabler service 202 can communicate with enabler container service 203 to request that enabler container service 203 determine if the application running in container 131 is Modern Standby capable. In sub-step 3b2, enabler container service 203 can examine application 123 to determine if it is Modern Standby capable. This examination can be similar to the examination that enabler service 202 performs in step 3b for non-containerized applications. If the application is Modern Standby capable, which application 123 is assumed to be, enabler container service 203 can notify enabler service 202 accordingly and provide information about application 123. Enabler service 202 could employ this application information and information about the container to update database 211 to reflect that the containerized application should be allowed in the future.

Figure 5C:
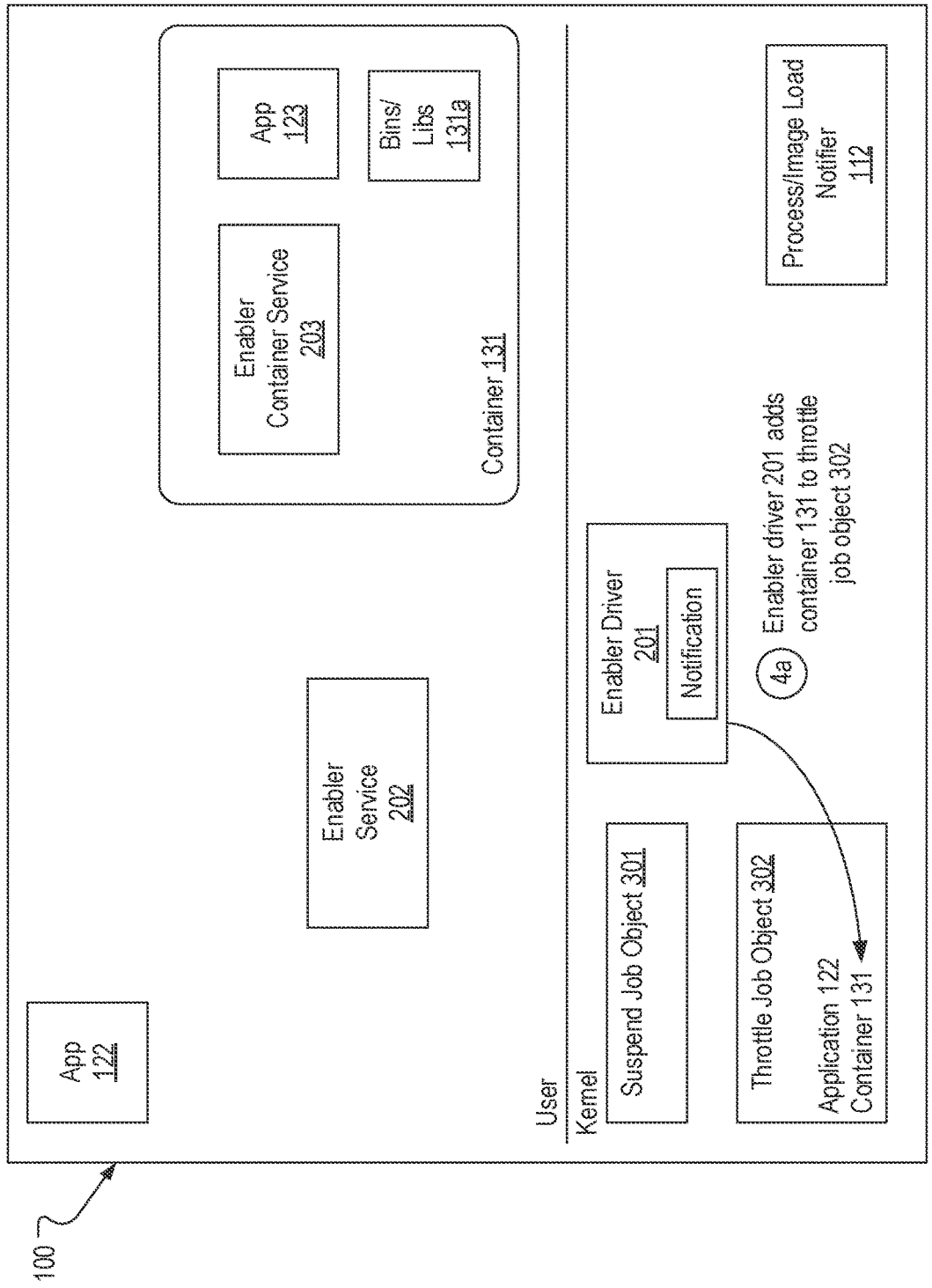

In step 3c, enabler service 202 can notify enabler driver 201 in the same manner as described above. Then, in step 4a as shown in FIG. 5C, enabler driver 201 can add container 131 (e.g., the process handle for container 131 in which application 123 is running) to throttle job object 302. Accordingly, in scenarios where the application is deployed in a container, enabler driver 201 adds the container to either suspend job object 301 or throttle job object 302 based on enabler service 202's and enabler container service 203's determination of whether the application deployed in the container is Modern Standby capable. By adding the container to throttle job object 302, the container process, including the application running in that process's context, will not be suspended during the DAR phase of Modern Standby.

Although not shown, enabler service 202 could leverage database 211 in containerized scenarios in the same manner as described above. For example, database 211 could maintain an identifier of a container that is used to deploy a particular application that is Modern Standby capable, and in such cases, could determine that an application deployed in a container having that identifier is Modern Standby capable by accessing database 211.

If system 100 were to enter Modern Standby while in the state represented in FIG. 5C, the operating system would not suspend application 122 or container 131 during the DAR phase because their processes are not included in suspend job object 301. To the contrary, given that their processes are included in throttle job object 301, the operating system will cause application 122 and container 131 to remain active during Modern Standby. As a result, application 122, which is a not a UWP application, and application 123, which is a UWP application but is running in container 131, will be allowed to perform activities during Modern Standby. In contrast, absent the techniques of the present invention, both application 122 and container 131 would have been suspended during the DAR phase and therefore neither application 122 nor application 123 would be able to perform any activities during Modern Standby.

In some embodiments, enabler service 202 and enabler container service 203 can interoperate during Modern Standby to allow an application deployed in a container to perform activities during Modern Standby. For example, during Modern Standby, enabler container service 203 can listen to application 123's notifications (e.g., toast notifications) and relay the notifications to enabler service 202. Enabler service 202 may then relay such notifications to the operating system for proper handling during Modern Standby.

Figure 6:
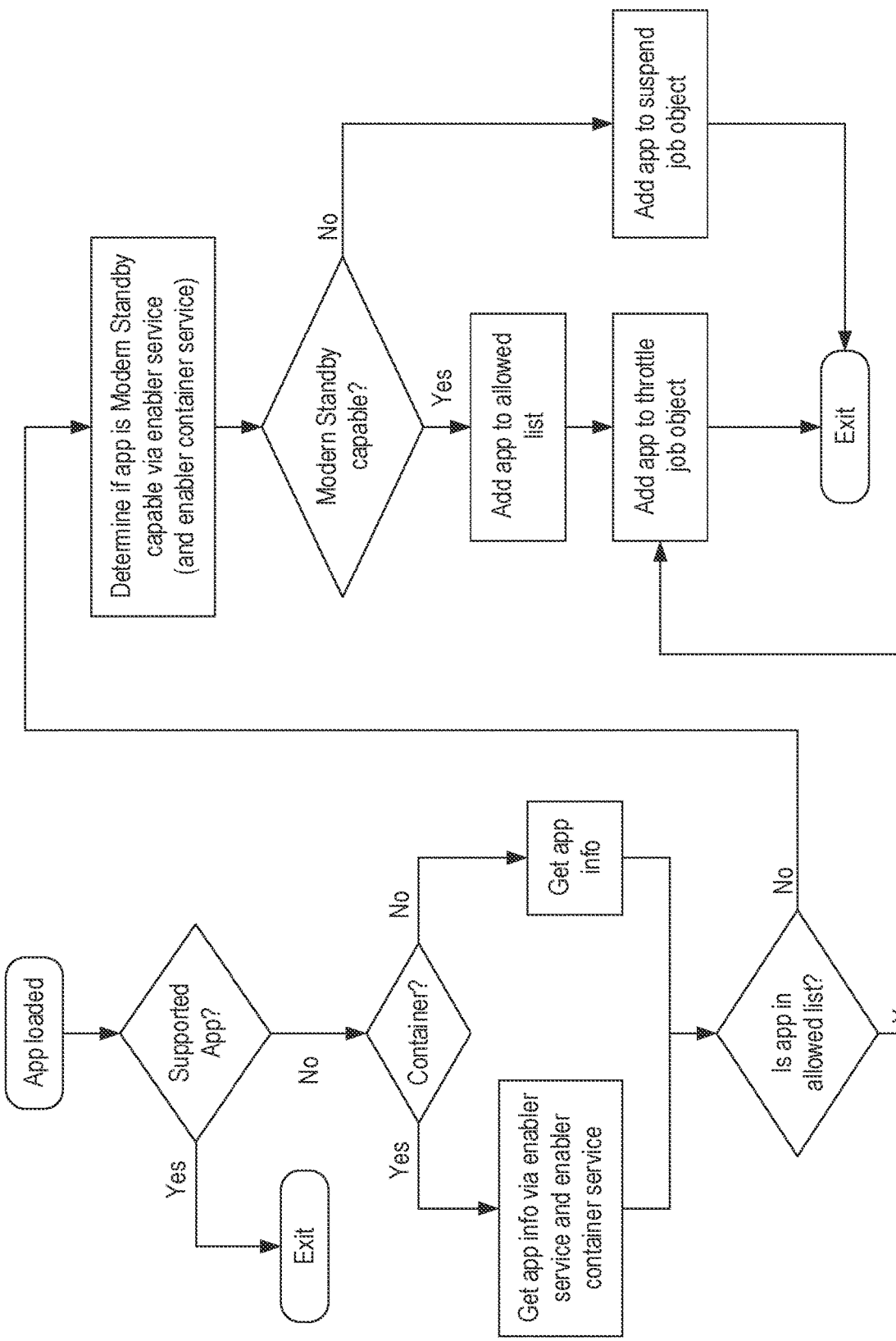
FIG. 6 is a flow diagram of an example process that an enabler driver can perform to enable Modern Standby for unsupported applications.

FIG. 6 provides a flow diagram that summarizes functionality that enabler driver 201 may perform in some embodiments of the present invention. When an application (or process) is loaded (including when an application is loaded within a container), enabler driver 201 can determine the type of the loaded application and whether the application is a supported application. For example, enabler driver 201 could determine if the application is a UWP application. If the application is supported, enabler driver 201 may exit thereby allowing DAR driver 111 to add the application to either suspend job object 301 or throttle job object 302.

If, however, the application is an unsupported application, enabler driver 201 can determine whether the application (or process) is a container. If so, enabler driver 201 can interface with enabler service 202 and enabler container service 203 to obtain information about the application deployed in the container. If not, enabler driver 201 may obtain information about the application directly (e.g., an image name or other identification of the application).

Once enabler driver 201 has obtained information about the application, it can determine whether the application is included in a list of applications that are allowed to remain active during Modern Standby. For example, enabler driver 201 could interface with enabler service 202 to access database 211. If the application is an allowed application, enabler driver 201 may add the application (or its container) to throttle job object 302.

If the application is not in the list of allowed applications, enabler driver 201 can interface with enabler service 202 (and enabler container service 203 when the application is deployed in a container) to determine if the application is Modern Standby capable. If not, enabler driver 201 can add the application to suspend job object 301. On the other hand, if the application is Modern Standby capable, the application may be added to the list of allowed applications and enabler driver 201 can add the application to throttle job object 301.

In summary, embodiments of the present invention can be implemented on a system that supports Modern Standby to increase the number and type of applications that can remain active during Modern Standby. Embodiments of the present invention can therefore enhance the ability of such systems to provide instant on/instant off functionality similar to smart phones. The techniques of such embodiments can be implemented on systems running Windows, Linux, Android or any other operating system that supports Modern Standby, including both connected and disconnected Modern Standby.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A system comprising:
one or more processors; and
computer storage media storing computer executable instructions which when executed implement a method for enabling Modern Standby for unsupported applications, the method comprising:

detecting that a first application has been loaded on a system;

determining that the first application is an unsupported application for the Modern Standby, wherein the unsupported application is an application that an operating system is configured to suspend during the Modern Standby;

in response to detecting that the first unsupported application has been loaded on the system, examining the first unsupported application to determine that the first unsupported application is capable of remaining active during the Modern Standby, wherein the first unsupported application is determined to be capable of remaining active during the Modern Standby in response to determining that the first unsupported application uses Application Programming interfaces (APIs) that are necessary to run properly during the Modern Standby;

in response to determining that the first unsupported application is capable of remaining active during the Modern Standby, adding the first unsupported application to a data structure that defines applications that will remain active when the system enters the Modern Standby;

detecting that a second application has been loaded on the system;

determining that the second application is an unsupported application for the Modern Standby;

in response to detecting that the second unsupported application has been loaded on the system, examining the second unsupported application to determine that the second unsupported application is not capable of remaining active during the Modern Standby, wherein the second unsupported application is determined to not be capable of remaining active during the Modern Standby in response to determining that the second unsupported application does not use the APIs that are necessary to run properly during the Modern Standby;

in response to determining that the second unsupported application is not capable of remaining active during the Modern Standby, adding the second unsupported application to a data structure that defines applications that will be suspended when the system enters the Modern Standby;

entering the Modern Standby;

accessing the data structure that defines applications that remain active during the Modern Standby to identify the first unsupported application;

in response to identifying the first unsupported application in the data structure that defines applications that remain active during the Modern Standby, foregoing suspension of the first unsupported application and continuing to execute the first unsupported application during the Modern Standby;

accessing the data structure that defines applications that will be suspended when the system enters the Modern Standby to identify the second unsupported application;

in response to identifying the second unsupported application in the data structure that defines applications that will be suspended when the system enters the Modern Standby, suspending the second unsupported application during the Modern Standby.

2. The system of claim 1, wherein examining the first unsupported application to determine that the first unsupported application is capable of remaining active during the Modern Standby and examining the second unsupported application to determine that the second unsupported application is not capable of remaining active during the Modern Standby comprises examining one or both of the respective unsupported application's manifest or the respective unsupported application's import address table.

3. The system of claim 1, wherein an enabler driver detects that each of the first and second unsupported application has been loaded on the system, the method further comprising:

in response to detecting that each of the first and second unsupported application has been loaded on the system, sending, by the enabler driver, a request to an enabler service, the request identifying the respective unsupported application, and wherein, in response to the request, the enabler service examines the respective unsupported application to determine whether the respective unsupported application is capable of remaining active during the Modern Standby.

4. The system of claim 3, wherein the request identifies the respective unsupported application by providing a process identifier.

5. The system of claim 1, wherein adding the first unsupported application to the data structure that defines applications that will remain active when the system enters the Modern Standby comprises adding the first unsupported application to a throttle job object.

6. The system of claim 1, wherein adding the second unsupported application to a data structure that defines applications that will be suspended when the system enters the Modern Standby comprises adding the second unsupported application to a suspend job object.

7. The system of claim 1, wherein the method further comprises:

in response to determining that the first unsupported application is capable of remaining active during the Modern Standby, adding the first unsupported application to a list of approved applications that is used to determine whether a loaded unsupported application is to be examined to determine whether the loaded unsupported application is capable of remaining active during the Modern Standby, the list of approved applications being separate from the data structure that defines applications that will remain active when the system enters the Modern Standby.

8. The system of claim 1, wherein the method further comprises:

in response to detecting that each of the first and second unsupported application has been loaded on the system, determining that the respective unsupported application is not included in a list of approved applications that is used to determine whether a loaded unsupported application is to be examined to determine whether the loaded unsupported application is capable of remaining active during the Modern Standby, the list of approved applications being separate from the data structure that defines applications that will remain active when the system enters the Modern Standby, wherein the respective unsupported application is examined in response to determining that the respective unsupported application is not included in the list of approved applications.

9. The system of claim 1, wherein detecting that one or both of the first and second unsupported application has been loaded on the system comprises detecting that a container has been loaded on the system.

10. The system of claim 1, wherein one or both of the first and second unsupported application is deployed in a container, and wherein an enabler container service executing in the container examines the respective unsupported application to determine whether the respective unsupported application is capable of remaining active during the Modern Standby.

11. The system of claim 1, wherein the method further comprises:
preventing a desktop activity moderator driver from adding the first unsupported application to the data structure that defines applications that will be suspended when the system enters the Modern Standby.

12. The system of claim 1, wherein the method further comprises:
detecting that a third application has been loaded on the system;
determining that the third application is a supported application; and
allowing an operating system component to add the third application to the data structure that defines applications that will remain active when the system enters the Modern Standby.

13. One or more computer storage media storing computer executable instructions which when executed on a system that supports Modern Standby implement a method for enabling the Modern Standby for unsupported applications, the method comprising:
detecting that a first application has been loaded on the system;
determining that the first application is an unsupported application for the Modern Standby, wherein the unsupported application is an application that an operating system is configured to suspend during the Modern Standby;
in response to detecting that the first unsupported application has been loaded on the system, examining the first unsupported application to determine that the first unsupported application is capable of remaining active during the Modern Standby, wherein the first unsupported application is determined to be capable of remaining active during the Modern Standby in response to determining that the first unsupported application uses Application Programming interfaces (APIs) that are necessary to run properly during the Modern Standby;
in response to determining that the first unsupported application is capable of remaining active during the Modern Standby, adding the first unsupported application to a data structure that defines applications that will remain active when the system enters the Modern Standby;
detecting that a second application has been loaded on the system;
determining that the second application is an unsupported application for the Modern Standby;
in response to detecting that the second unsupported application has been loaded on the system, examining the second unsupported application to determine that the second unsupported application is not capable of remaining active during the Modern Standby, wherein the second unsupported application is determined to not be capable of remaining active during the Modern Standby in response to determining that the second unsupported application does not use the APIs that are necessary to run properly during the Modern Standby;
in response to determining that the second unsupported application is not capable of remaining active during the Modern Standby, adding the second unsupported application to a data structure that defines applications that will be suspended when the system enters the Modern Standby;
entering the Modern Standby;
accessing the data structure that defines applications that remain active during the Modern Standby to identify the first unsupported application;
in response to identifying the first unsupported application in the data structure that defines applications that remain active during the Modern Standby, foregoing suspension of the first unsupported application and continuing to execute the first unsupported application during the Modern Standby;
accessing the data structure that defines applications that will be suspended when the system enters the Modern Standby to identify the second unsupported application;
in response to identifying the second unsupported application in the data structure that defines applications that will be suspended when the system enters the Modern Standby, suspending the second unsupported application during the Modern Standby.

14. The computer storage media of claim 13, wherein examining the first unsupported application to determine that the first unsupported application is capable of remaining active during the Modern Standby and examining the second unsupported application to determine that the second unsupported application is not capable of remaining active during the Modern Standby comprises examining one or both of the respective unsupported application's manifest or the respective unsupported application's import address table.

15. The computer storage media of claim 13, wherein an enabler driver detects that each of the first and second unsupported application has been loaded on the system, the method further comprising:
in response to detecting that each of the first and second unsupported application has been loaded on the system, sending, by the enabler driver, a request to an enabler service, the request identifying the respective unsupported application, and wherein, in response to the request, the enabler service examines the respective unsupported application to determine whether the respective unsupported application is capable of remaining active during the Modern Standby.

16. The computer storage media of claim 15, wherein the request identifies the respective unsupported application by providing a process identifier.

17. The computer storage media of claim 13, wherein one or both of the first and second unsupported application is deployed in a container, and wherein an enabler container service executing in the container examines the respective unsupported application to determine whether the respective unsupported application is capable of remaining active during the Modern Standby.

18. The computer storage media of claim 13, wherein the method further comprises:
adding the first unsupported application to a list of allowed applications that is used to determine whether a loaded unsupported application is to be examined to determine whether the loaded unsupported application is capable of remaining active during the Modern Standby, the list of approved applications being separate from the data structure that defines applications that will remain active when the system enters the Modern Standby;

in response to being notified that the first unsupported application has been loaded a second time on the system, determining that the first unsupported application is included in the list of allowed applications; and in response to determining that the first unsupported application is included in the list of allowed applications, adding the first unsupported application to the data structure that defines applications that will remain active when the system enters the Modern Standby.

19. A method for enabling Modern Standby for unsupported applications, the method comprising:

detecting that a first application has been loaded on the system;

determining that the first application is an unsupported application for the Modern Standby, wherein the unsupported application is an application that an operating system is configured to suspend during the Modern Standby;

in response to detecting that the first unsupported application has been loaded on the system, examining the first unsupported application to determine that the first unsupported application is capable of remaining active during the Modern Standby, wherein the first unsupported application is determined to be capable of remaining active during the Modern Standby in response to determining that the first unsupported application uses Application Programming interfaces (APIs) that are necessary to run properly during the Modern Standby;

in response to determining that the first unsupported application is capable of remaining active during the Modern Standby, adding the first unsupported application to a data structure that defines applications that will remain active when the system enters the Modern Standby;

detecting that a second application has been loaded on the system;

determining that the second application is an unsupported application for the Modern Standby;

in response to detecting that the second unsupported application has been loaded on the system, examining the second unsupported application to determine that the second unsupported application is not capable of remaining active during the Modern Standby, wherein the second unsupported application is determined to not be capable of remaining active during the Modern Standby in response to determining that the second unsupported application does not use the APIs that are necessary to run properly during the Modern Standby; and in response to determining that the second unsupported application is not capable of remaining active during the Modern Standby, adding the second unsupported application to a data structure that defines applications that will be suspended when the system enters the Modern Standby;

entering the Modern Standby;

accessing the data structure that defines applications that remain active during the Modern Standby to identify the first unsupported applications;

in response to identifying the first unsupported application in the data structure that defines applications that remain active during the Modern Standby, foregoing suspension of the first unsupported application and continuing to execute the first unsupported application during the Modern Standby;

accessing the data structure that defines applications that will be suspended when the system enters the Modern Standby to identify the second unsupported application;

in response to identifying the second unsupported application in the data structure that defines applications that will be suspended when the system enters the Modern Standby, suspending the second unsupported application during the Modern Standby.

20. The method of claim 19, wherein an enabler driver detects that each of the first and second unsupported application has been loaded on the system and adds the respective unsupported application to the respective data structure, and either an enabler service or an enabler container service examines the first and second unsupported application.

* * * * *